United States Patent
Schnalzger et al.

(12)

(10) Patent No.: US 6,688,904 B1
(45) Date of Patent: Feb. 10, 2004

(54) CONNECTION OF STAMPED GRID TERMINAL TO COIL WIRE OF A MAGNETIC VALVE

(75) Inventors: Guenther Schnalzger, Blaichach (DE); Tobias Fluck, Immenstadt (DE); Stefan Timmermann, Burgberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/807,371

(22) PCT Filed: Jun. 18, 1999

(86) PCT No.: PCT/DE99/01790

§ 371 (c)(1),
(2), (4) Date: Apr. 12, 2001

(87) PCT Pub. No.: WO00/24088

PCT Pub. Date: Apr. 27, 2000

(30) Foreign Application Priority Data

Oct. 17, 1998  (DE) ......................................... 198 48 039

(51) Int. Cl.[7] ............................................... B60T 8/36
(52) U.S. Cl. .................................... 439/404; 303/119.3
(58) Field of Search ........................... 439/34, 404, 405; 303/119.2, 119.3; 137/884

(56) References Cited

U.S. PATENT DOCUMENTS 5,127,440 A * 7/1992 Maas et al. ................. 137/884

FOREIGN PATENT DOCUMENTS

| DE | 19619968 | * 11/1997 |
| DE | 196 29 643 A | 1/1998 |
| DE | 297 01 467 | 4/1998 |
| DE | 19718242 | * 11/1998 |
| EP | 0 829 944 A | 3/1998 |

* cited by examiner

*Primary Examiner*—Neil Abrams
(74) *Attorney, Agent, or Firm*—Ronald E. Greigg

(57) ABSTRACT

For bonding magnet valves, inserted into a hydraulic block, to an electronic control circuit for wheel slip control, the invention proposes that wire ends of coils of the magnet valve be fixed to one face end of a winding carrier and bonded by means of slit terminals, which are integral with a stamped grid that carries the electrical and electronic components that form the control circuit.

9 Claims, 2 Drawing Sheets

CONNECTION OF STAMPED GRID TERMINAL TO COIL WIRE OF A MAGNETIC VALVE

CROSS-REFERENCE TO RELATED APPLICATIONS

This application is a 35 USC 371 application of PCT/DE99/01790 filed on Jun. 18, 1999.

BACKGROUND OF THE INVENTION

1. Field of the Invention

The invention relates to an arrangement for bonding a component, having an electrical terminal, to an electrical and more particulary to such an arrangement especially, for bonding a-magnet valve, or an electric motor, of a hydraulic vehicle brake system that has a slip control system to an electronic closed-loop control circuit for slip control. The term "electrical circuit" is in intended to encompass electronic circuits and the like.

2. Description of the Prior Art

From German Patent Disclosure DE 196 19 968 A1, a pressure control device for an electrohydraulic vehicle brake system is known. The known pressure control device has an electrical circuit and also has a hydraulic block, into which magnet valves are inserted. For bonding the magnet valves to the electrical circuit, plug contacts are provided, in the form of bent wires that lead from the electrical circuit to the magnet valves. One end of the plug contacts is inserted into a recess in winding carriers of coils of the magnet valves, and a coil contact rests in the recess, so that the plug contact is connected to the coil contact without welding or soldering. As an alternative, it is stated that the plug contact can be inserted into an IDC or insulation displacement contact in the recess of the winding carrier of the magnet valve.

Another end of the plug contact is provided with a spreading contour and is inserted by frictional engagement into an opening of a circuit board that carries the electrical circuit.

The known device has the disadvantage that it requires the wirelike plug contact as a separate component for bonding the magnet valves to the electrical circuit. The plug contact must first be inserted into the receptacle of the magnet valves, before the electrical circuit is inserted onto the plug contacts of the magnet valves. The alignment of the plug contacts, inserted into the recesses of the winding carriers of the magnet valves, with respect to the openings in the circuit board of the electrical circuit also appears problematic; this alignment must be so precise that when the electrical circuit is inserted onto the plug contacts, each plug contact will meet its opening.

SUMMARY OF THE INVENTION

In the arrangement according to the invention for bonding a component, having an electrical terminal, to an electrical circuit the electrical circuit has one slit terminal for each electrical terminal to be bonded. By mounting the electrical circuit on the component or components, the electrical terminal or electrical terminals of the component or components are inserted into the slit terminal or slit terminals and thereby bonded. By means of a mechanically solid connection of the slit terminal to the electrical circuit, the alignment of the slit terminal with respect to the electrical terminal is assured, which especially when there is a number of electrical components each with a plurality of electrical terminals is of considerable advantage for the plug-in capability of the electrical circuit onto the components. A further advantage of the invention is that it needs no separate bonding elements that as individual parts would have to be connected both to the electrical terminals of the components to be bonded and to the electrical circuit. The work step of the bonding is limited to inserting the electrical circuit into the components. A further advantage is that by the shearing action of clamping legs of the slit terminal, any insulation of the electrical terminals that may be present is severed, and any oxide film or the like that impairs the electrical conductivity is removed as the electrical circuit is inserted onto the components and in the attendant bonding. At the same time, a contact face between the electrical terminal and the slit terminal is increased in area, so that overall, the result is high-quality bonding with low transition resistance. A further advantage of the arrangement for bonding according to the invention is its very low rate of mistakes upon assembly.

A feature of the arrangement according to the invention in which the electrical circuit has a stamped grid, by means of which electrical and/or electronic components of the circuit are interconnected electrically and mechanically secured, is especially advantageous. This feature of the invention has the advantage in particular that the slit terminals can be embodied integrally with the stamped grid. The slit terminals are bent over if needed after the stamped grid has been stamped out. They are produced in a single operation with the stamping of the stamped grid, so that the production of the slit terminals does not require a separate operation. Securing the slit terminals to the stamped grid is also unnecessary, since the slit terminals are integral with the stamped grid, and there is also economy of material, since the slit terminals are stamped together with the stamped grid out of one and the same metal sheet as the stamped grid, and do not have to be stamped out of an extra piece of sheet metal.

BRIEF DESCRIPTION OF THE DRAWINGS

The invention will be described in further detail below, taken in conjunction with the drawings in which.

DESCRIPTION OF THE PREFERRED EMBODIMENT

Figure 1:
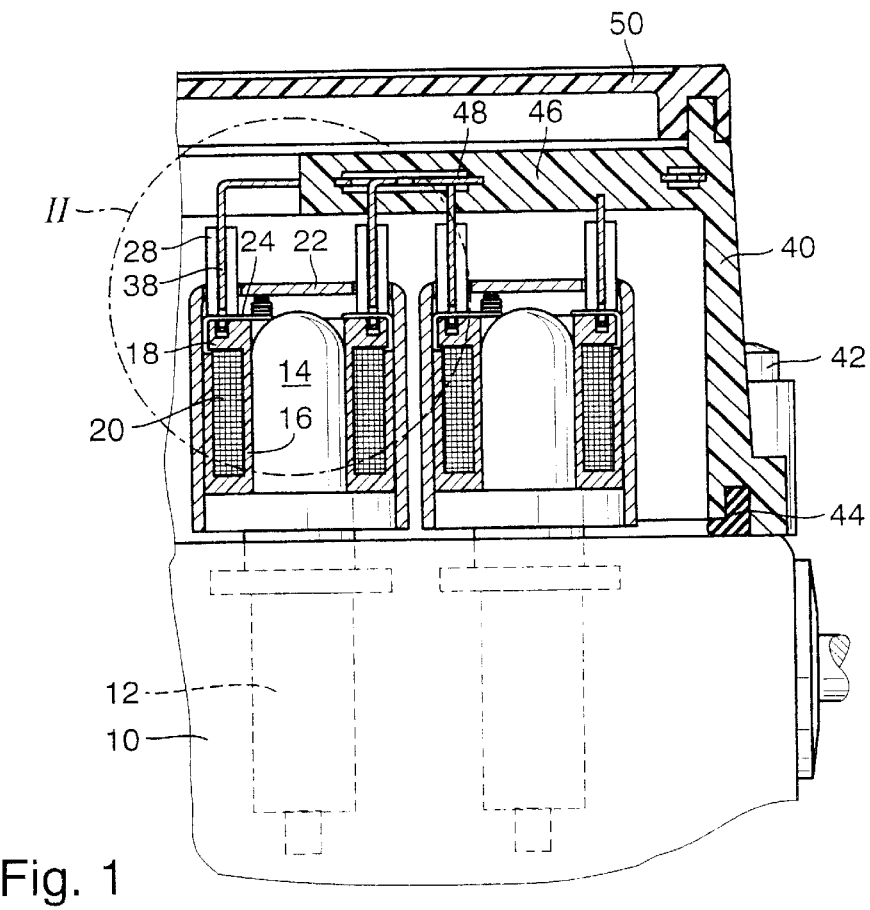
FIG. 1 is an arrangement according to the invention, partly in section.

The exemplary embodiment shown in FIG. 1 of an arrangement according to the invention includes a hydraulic block 10, into which magnet valves 12 are inserted. The hydraulic block 10 is part of a hydraulic vehicle brake system, not otherwise shown, that has a slip control system. The magnet valves 12 are virtually pin-like in shape; they have a hydraulic part, with which they are inserted into the hydraulic block 10, and a magnet part, which protrudes out of the hydraulic block 10. The magnet part of the magnet valves 12 is located in a valve dome 14. A winding carrier 16 is slipped onto the valve dome 14 with a slight press fit. The winding carrier 16 is a tubular part, injection molded of plastic, with end flanges 18 on both ends. Between the end flanges 18, a coil 20 is wound onto the winding carrier 16. A cup-shaped housing 22, which surrounds both the valve dome 14 and the winding carrier 16 having the coil 20, is seated on the magnet part of the magnet valves 12.

Figure 2:
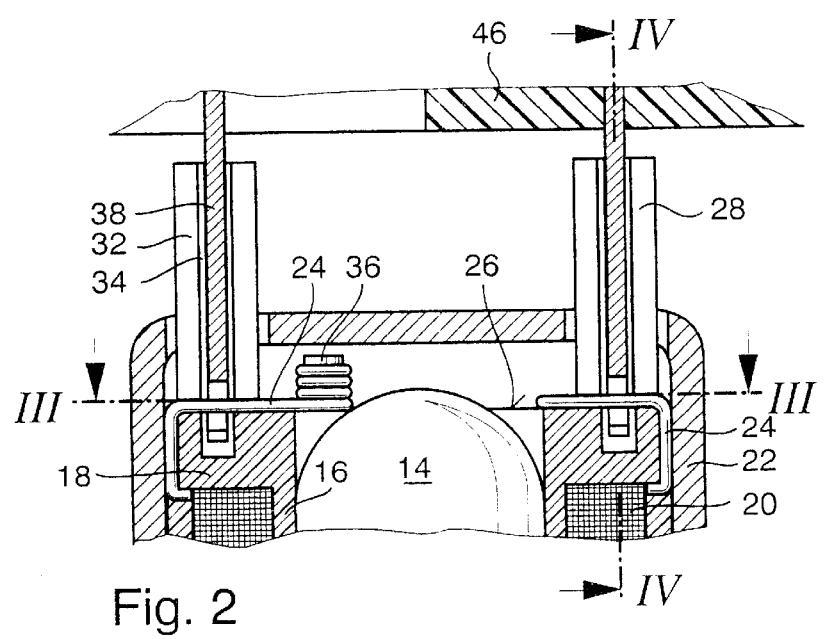
FIG. 2 is an enlarged view of a detail II in FIG. 1, in a section taken through the line II—II of FIG. 3.

Two wire ends 24 of the coil 20 are extended around an end flange 18, remote from the hydraulic block 10, onto an end face 26 of the end flange 18 that faces away from the hydraulic block 10 (FIG. 2). Two retainers 28 protrude axially parallel away from the end flange 18 remote from the hydraulic block 10, specifically from the end flange 26, remote from the hydraulic block 10, of the end flange 18 remote from the hydraulic block 10. The retainers 28 are integral with the end flange 18 and thus are integral with the winding carrier 16.

Figure 3:
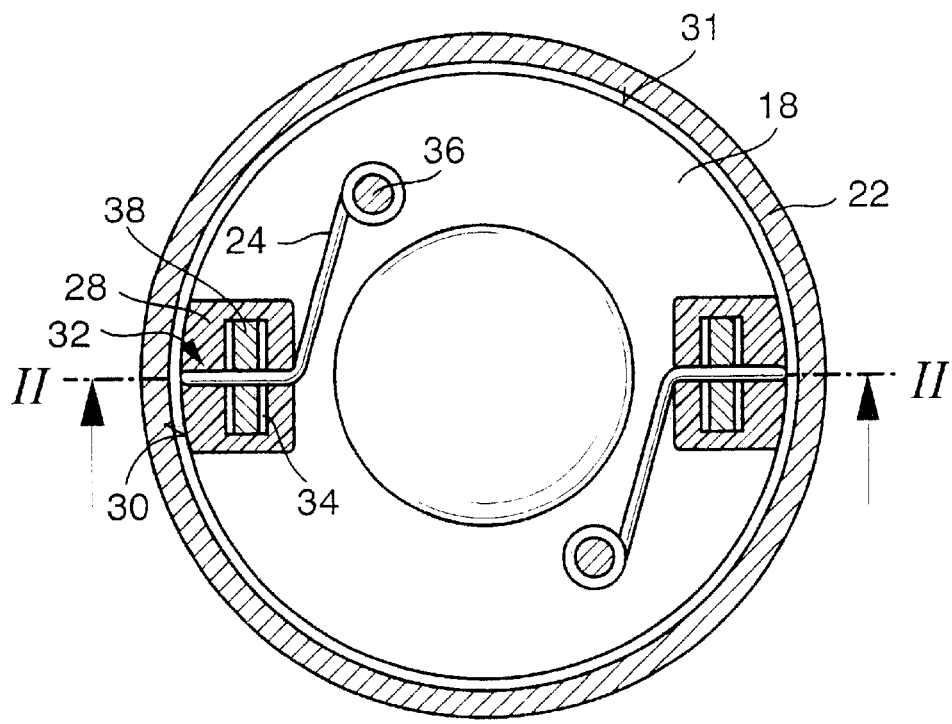
FIG. 3, is a section taken along the line III—III of FIG. 2.

The two retainers 28 are disposed facing one another on the end flange 18; they are prismatic and have a virtually rectangular cross-sectional shape, and outer faces 30, facing away from one another, of the retainers 28, which are flush with one edge 31 of the end flange 18, are curved to conform to the rounding of the edge 31 (FIG. 3).

The two retainers 28 are provided with two intersecting slits 32, 34: One of the two slits 32 is disposed radially to the winding carrier 16 and will hereinafter be called the radial slit 32. It extends longitudinally as far as the end face 26 of the end flange 18, from which the retainers 28 protrude. A width of the radial slit 32 is equivalent to a diameter of the wire ends 24 of the coils 20. The radial slit 32 passes transversely through the retainers 28; that is, the radial slit 32 is open on both sides. The wire ends 24, resting on the end flange 18 of the winding carrier 16, are passed through the radial slit 32 of the retainers 28 and are each wound around a respective fixation peg 36, which also protrudes from the end face 26, remote from the hydraulic block 10, of the end flange 18, remote from the hydraulic block 10, of the winding carrier 16. In this way, both wire ends 24 of the coil 20 are fixed on the end face 26, remote from the hydraulic block 10, of the end flange 18, remote from the hydraulic block 10, of the winding carrier 16.

The other slit 34 in the retainer 28 is oriented transversely to the radial slit 32 and at a tangent to the a winding carrier 16 in the retainer 28. This slit 34 forms a receptacle 34 for a slit terminal 38. The slit forming the receptacle 34 passes longitudinally through the holder 28 and extends as far as the inside of the end flange 18 of the winding carrier 16, where the receptacle 34 ends at a distance from the coil 20, so that the end flange 18 electrically insulates the slit terminal 38 from the coil 20. Accordingly, the slit 34 that forms the receptacle 34 is longer than the radial slit 32 that receives the wire end 24 of the coil 20. The slit 34 that forms the receptacle does not pass in the transverse direction through the retainer 28; it is closed on both of its long sides.

A boxlike plastic injection-molded housing 40 is mounted with screws 42 to the hydraulic block 10 and surrounds the magnet parts of the magnet valves 12. By means of the rubber seal 44, the housing 40 is sealed off on the hydraulic block 10. A stamped grid 48 is embedded in a housing ceiling 46 of the housing 40 that covers the magnet parts of the magnet valves 12 at a distance from the hydraulic block 10, and the stamped grid is extrusion-coated with the same plastic that forms the housing ceiling 46. The stamped grid 48, known per se, has sheet-metal strips that are electrically insulated from one another and form conductor tracks, with which electrical/electronic components, not shown in the drawing, a are interconnected with one another and mechanically secured; these components form an electrical/electronic control circuit for slip control of the hydraulic vehicle brake system, of which the hydraulic block 10 is a component. By the extrusion coating with the plastic that forms the housing 40 and the housing ceiling 46, the sheet-metal strips of the stamped grid 46 that form the conductor tracks are mechanically retained and insulated electrically from one another. A cap 50 mounted on the housing 40 covers the electrical/electronic components of the electrical/electronic control circuit.

Figure 4:
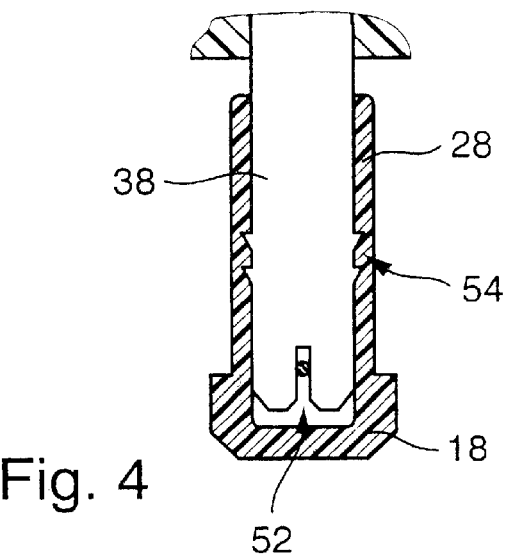
FIG. 4 is a section taken along the line IV—IV of FIG. 2.

The slit terminals 38 received in the retainers 28 of the winding carrier 16 are integral with conductor tracks of the stamped grid 48. The slit terminals 38 are tonguelike portions of conductor tracks of the stamped grid 48, which in the exemplary embodiment shown are bent over, perpendicular to the stamped grid 48, in the direction of the hydraulic block 10. On their free end, a slit 52 is made in the slit terminals 38; its slit width is less than the diameter of the wire ends 24 of the coil 20 (FIG. 4). In side view, the slit terminals 38 have a Christmas-tree profile 54, with which they are fixed with claws by positive engagement in the retainers 28 of the winding carrier 16.

The assembly of the arrangement according to the invention proceeds as follows: First, the magnet valves 12 are inserted into the hydraulic block 10. Next, the winding carriers 16, onto which the coils 20 have already been wound, are slipped onto the valve dome 14 of the magnet valves 12. The wire ends 24 of the coils 20 have been placed, during winding of the coils 20 onto the winding carriers 16 as already described, into the radial slits 32 of the retainers 28 that protrude from the end flange 18 of the winding carrier 16 and have been wound about the fixation peg 36; that is, the wire ends 24 are fixed on the end flange 18 of the winding carriers 16 in the retainers 28 transversely to an insertion direction of the slit terminals 38. After the winding carriers 16 have been inserted onto the magnet valves 12, the housing 40 is placed on the hydraulic block 10 and screwed to it. As the housing 40 is put in place, the slit terminals 38 enter their receptacles 34 in the retainers 28 of the winding carriers 16, and the wire ends 24 of the coils 20 enter the slits 52 of the slit terminals 38, so that by means of a pinch bonding, the coils 20 are electrically conductively connected to conductor tracks of the stamped grid 48. By means of the Christmas-tree profiling 54 of the slit terminals 38 that are firmly fixed with claws in the retainers 28, the slit terminals 38 and thus the stamped grid 48 that is integral with the slit terminals 38 are mechanically connected to the winding carriers 16.

The invention is not limited to electrical terminals in the form of wire (wire ends 24); for instance, tonguelike electrical terminals of an electrical or electronic component can also (although not shown) engage the slit terminals 38.

The foregoing relates to preferred exemplary embodiments of the invention, it being understood that other variants and embodiments are thereof possible within the spirit and scope of the invention, the latter being defined by the appended claims.

What is claimed is:

1. In an arrangement for making electrical connection from an electrical circuit to a magnet valve (12) having an electrical terminal (24), in which the magnet valve (12) is inserted into a hydraulic block (10) and has a magnet part (14) with a winding carrier (16) that carries a coil (20), to which winding carrier the electrical terminal (24) is fixed, and the magnet part (14) is surrounded by a housing (40) that is mounted on the hydraulic block (10) and has the electrical circuit disposed inside it, the improvement wherein the electrical circuit has a terminal (38) with a slit (52), which terminal (38) extends from the housing (40) toward the hydraulic block (10), and is arranged such that when the housing (40) is placed on the hydraulic block (10) the terminal (38) is slipped onto the electrical terminal (24), wherein the electrical terminal (24) is embodied as a wire which extends from the coil and extends approximately transversely to the slit (52) of the terminal (38).

2. The arrangement of claim 1, wherein the electrical circuit has a stamped grid (48).

3. The arrangement of claim 2, wherein the terminal (38) is formed integrally with the stamped grid (48).

4. The arrangement of claim 1, wherein at least one electrical terminal (24) is an end of the wire of the coil, and is fixed to the winding carrier (16) approximately transversely to the slit (52) of the terminal (38).

5. The arrangement of claim 4, wherein the winding carrier (16) has a slit shaped receptacle (34) which receives the terminal (38), and in which receptacle the terminal (38) rests.

6. The arrangement of claim 5, wherein the terminal (38) has a Christmas-tree profile (54) having claws with which it is fixed in the receptacle (34).

7. The arrangement of claim 1, wherein the hydraulic block (10) together with the magnet valve (12) is part of a hydraulic control circuit of a traction control system of a hydraulic vehicle brake system, and the electrical circuit is an electronic closed-loop control circuit of the traction control system of the hydraulic vehicle brake system.

8. The arrangement of claim 5, wherein the magnet valve (12) is inserted into a hydraulic block (10).

9. The arrangement of claim 8, wherein the hydraulic block (10) together with the magnet valve (12) is part of a hydraulic control circuit of a slip control system of a hydraulic vehicle brake system, and the electrical circuit is an electronic closed-loop control circuit of the traction control system of the hydraulic vehicle brake system.

* * * * *